(No Model.)
F. M. CARNAHAN.
STUMP SAWING MACHINE.
No. 363,588. Patented May 24, 1887.
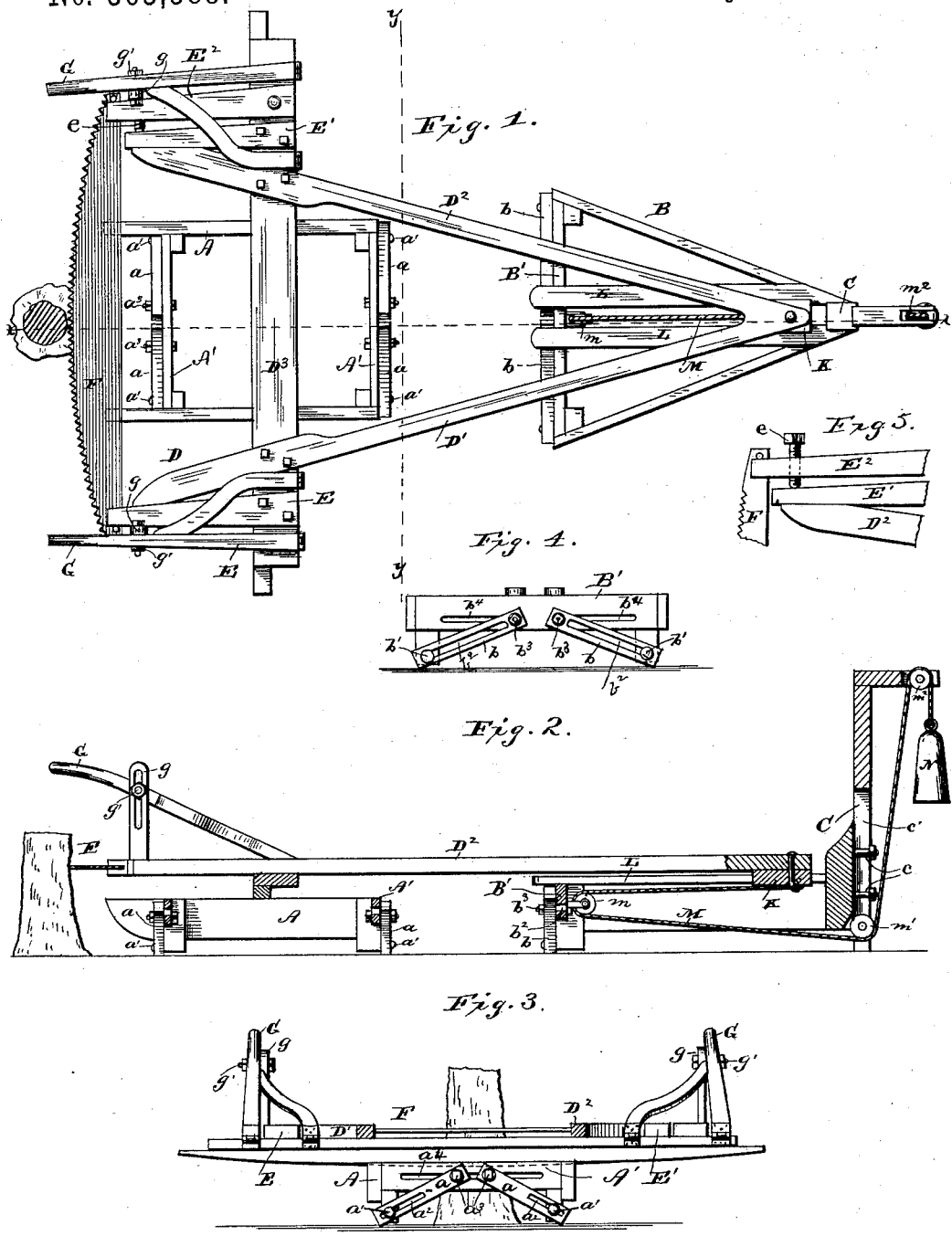
Witnesses.
Chas. R. Butt,
A. J. Stewart.
Inventor.
Francis M. Carnahan
by Franck O. Johns
his Attorney.

UNITED STATES PATENT OFFICE.

FRANCIS M. CARNAHAN, OF ADRIAN, MICHIGAN.

STUMP-SAWING MACHINE.

SPECIFICATION forming part of Letters Patent No. 363,588, dated May 24, 1887.

Application filed August 4, 1886. Serial No. 209,979. (No model.)

*To all whom it may concern:*

Be it known that I, FRANCIS M. CARNAHAN, a citizen of the United States, residing in Adrian township, in the county of Lenawee and State of Michigan, have invented certain new and useful Improvements in Stump-Sawing Machines; and I do hereby declare the following to be a full, clear, and exact description of the invention, such as will enable others skilled in the art to which it appertains to make and use the same.

My invention relates to certain improvements in machines for sawing stumps or standing timber; and it consists in certain novelty in the construction and arrangement of the various parts, all of which I will now proceed to point out and describe, reference being had to the accompanying drawings, in which—

Figure 1 is a top plan view of a machine embodying my invention; Fig. 2, a vertical longitudinal section of the same, taken on the line $x\ x$ of Fig. 1. Fig. 3 is a vertical cross-section taken on line $y\ y$ of Fig. 1, and Figs. 4 and 5 are details showing various parts of my invention.

Referring to said drawings, A represents a stand or slideway, which supports the forward end of the frame carrying the saw-blade. Said stand A is provided with adjustable supports $a$, secured to the stand by pins $a'$, passing through slots $a^2$ in the supports, and by bolts $a^3$, secured to the upper ends of said supports and passing through the slots $a^4$ in the cross-bars A' of the stand.

B is a triangular stand, which supports the rear end of the saw-frame and the feed mechanism, as hereinafter described. The forward end of the frame B is provided with adjustable supports $b$, secured to the frame by pins $b'$, passing through the slots $b^2$ in the supports, and by bolts $b^3$, secured to the upper ends of said supports and passing through slots $b^4$ in the cross-bar B'. The rear end of the frame B is provided with an adjustable standard, C, secured to the frame by bolts $c$, passing through slots $c'$ in the standard. This standard also serves as a support for the rear end of said frame B. By means of the adjustable supports described the frames A and B can be readily adjusted to suit the inequalities of the ground.

D is a triangular frame, which carries the saw-blade, and is composed of the converging arms D' D$^2$, connected by the cross-bar D$^3$.

E E' are forwardly-projecting arms rigidly secured to the cross-bar D$^3$ and ends of the arms D' D$^2$.

E$^2$ is an arm pivotally secured to the cross-bar D$^3$.

F is the saw-blade secured in the ends of the rigid arm E and pivoted arm E$^2$. Said arm E$^2$ is provided with a set-screw, $e$, which bears against the rigid arm E'. By means of this set-screw $e$ the saw-blade can be tightened or loosened, as desired.

The cross-bar D$^3$ rests on and is reciprocated across the stand or slideway A, and the under side of said cross-bar D$^3$ is slightly curved, so as to compensate for any sag in the center of the saw as it is reciprocated.

G G are handles by means of which the saw is operated. Said handles are pivotally secured at their lower ends to the cross-bar D$^3$, the upper ends of the handles being secured to slotted standards $g\ g$ by bolts $g'\ g'$. Said handles can thus be adjusted to the desired height to suit the operator.

The rear end of the saw-frame is pivoted to a sliding block, K, mounted on guide-bars L on the frame B.

M is a rope secured to the guide-block K, and passing over pulleys $m, m'$, and $m^2$ on the frame B and standard C. To the end of the rope is attached a weight, N, which operates to draw the block forward, and thus feed the saw toward the stump or tree as the same is cut.

In operation, the forward stand, A, is placed near the stump or timber to be cut. The rear stand is then placed in a line with the same, both of said frames being adjusted to suit the inequalities of the ground, so that their upper surfaces will be level, and they are then anchored in any suitable manner. The saw-frame is then reciprocated by the operators, and as the stump or tree is cut the weight connected with the sliding block feeds said saw forward.

Having thus fully described my invention, what I claim as new, and desire to secure by Letters Patent, is—

In a stump-sawing machine, the front stand or slideway, A, having adjustable supports, the rear stand, B, having adjustable supports and provided with the guide-bars L, and sliding block K, mounted on said guide-bars and connected with the operating-weight N by the rope M, passing over pulleys, as described, in combination with the frame D, carrying the saw-blade F, and having its rear end pivoted to the sliding block K, and provided with the cross bar D³, curved on its under side and resting on the frame A, all arranged and operating substantially as set forth.

In testimony whereof I affix my signature in presence of two witnesses.

FRANCIS M. CARNAHAN.

Witnesses:
R. B. ROBBINS,
M. P. STRAIGHT.